No. 680,435. Patented Aug. 13, 1901.
J. G. McALPINE, Jr.
FOUNTAIN COMB.
(Application filed Nov. 18, 1899.)
(No Model.)
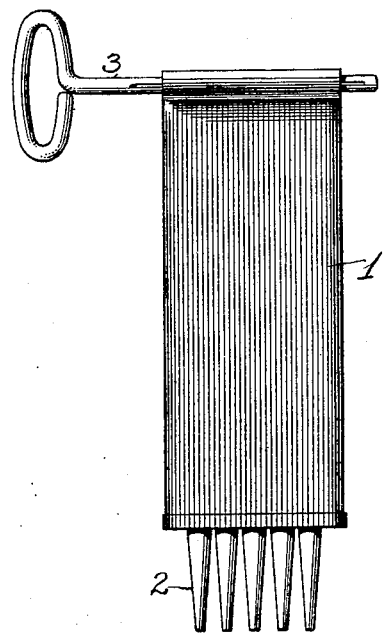

United States Patent Office.

JAMES GARROW McALPINE, JR., OF GILROY, CALIFORNIA.

FOUNTAIN-COMB.

SPECIFICATION forming part of Letters Patent No. 680,435, dated August 13, 1901.

Application filed November 18, 1899. Serial No. 737,453. (No model.)

*To all whom it may concern:*

Be it known that I, JAMES GARROW MC-ALPINE, Jr., a citizen of the United States, residing at Gilroy, in the county of Santa Clara and State of California, have invented certain new and useful Improvements in Fountain-Combs, of which the following is a specification.

This invention relates to a comb which has hollow teeth and a reservoir communicating with the teeth and adapted to contain a medicament, tonic, or cleansing substance.

The object is to provide a simple and cheap article of this nature by means of which powdered, pasty, or liquid substances may be conveniently applied directly to the scalp of the person or hide of the beast for treating sores or wounds or invigorating the hair-roots or cleansing the epidermis without soiling the hands or fouling and matting the hair.

This comb has a number of hollow teeth of convenient shape and a reservoir of any desired size formed of pliable metal communicating with the teeth and adapted to be reduced in size for causing a flow of compound from the reservoir through the teeth.

The accompanying drawing shows a side view of a form of fountain-comb that embodies the invention.

The reservoir 1, which forms the body of the comb, is preferably a tube of oblong cross-section made of pliable sheet metal. Tubular teeth 2 project from the lower end of this reservoir. The teeth are circular in cross-section and are larger in diameter at the upper than at the lower ends; but of course the teeth can be oblong or square in cross-section. All the teeth shown are tubular; but some can be solid without departing from the invention.

Any substances suitable for accomplishing the desired result may be filled into the reservoirs of these combs before the upper ends are closed by folding the edges together and then applied to the skin by thrusting the ends of the tubular teeth through the hair and moving them about in contact with the skin at the roots of the hair and at the same time compressing the upper ends of the reservoirs, so that the substances will be fed out at the ends of the teeth. The openings through the teeth may be made of such size that but minute drops or small quantities will escape when the reservoir is compressed or the openings may be made sufficiently large to permit the passage of a considerable amount of substance from the reservoir.

The upper end of the pliable metal tube is adapted to be folded together by the fingers for expressing the substance as it is desired for use or it may be rolled up by a key 3, as shown in the drawing.

Washes for cleansing or antiseptic or disinfecting purposes may in this manner and by these combs be applied to the skin of a person or animal without any of the substance being applied coming in contact with the hands or besmirching the hair. This method of treatment is cleanly and is effective, for the substances applied are directly placed where wanted and a large quantity is not uselessly disseminated throughout the hair. When the reservoirs are empty, they may be thrown away, as their cost is small.

I claim as my invention—

A comb having a medicament-reservoir formed of a tube of pliable metal, means for contracting one end of the tube, and a number of tapering teeth projecting in a row from the other end of the tube and communicating at their larger ends with the interior and having outlet-openings through their smaller ends, substantially as specified.

JAMES GARROW McALPINE, JR.

Witnesses:
S. J. MAYOEK,
W. A. WHITEHURST.